A. W. LIMONT.
APPARATUS FOR MAKING PROJECTILE BANDS AND THE LIKE.
APPLICATION FILED NOV. 5, 1915.

1,266,963.

Patented May 21, 1918.
4 SHEETS—SHEET 1.

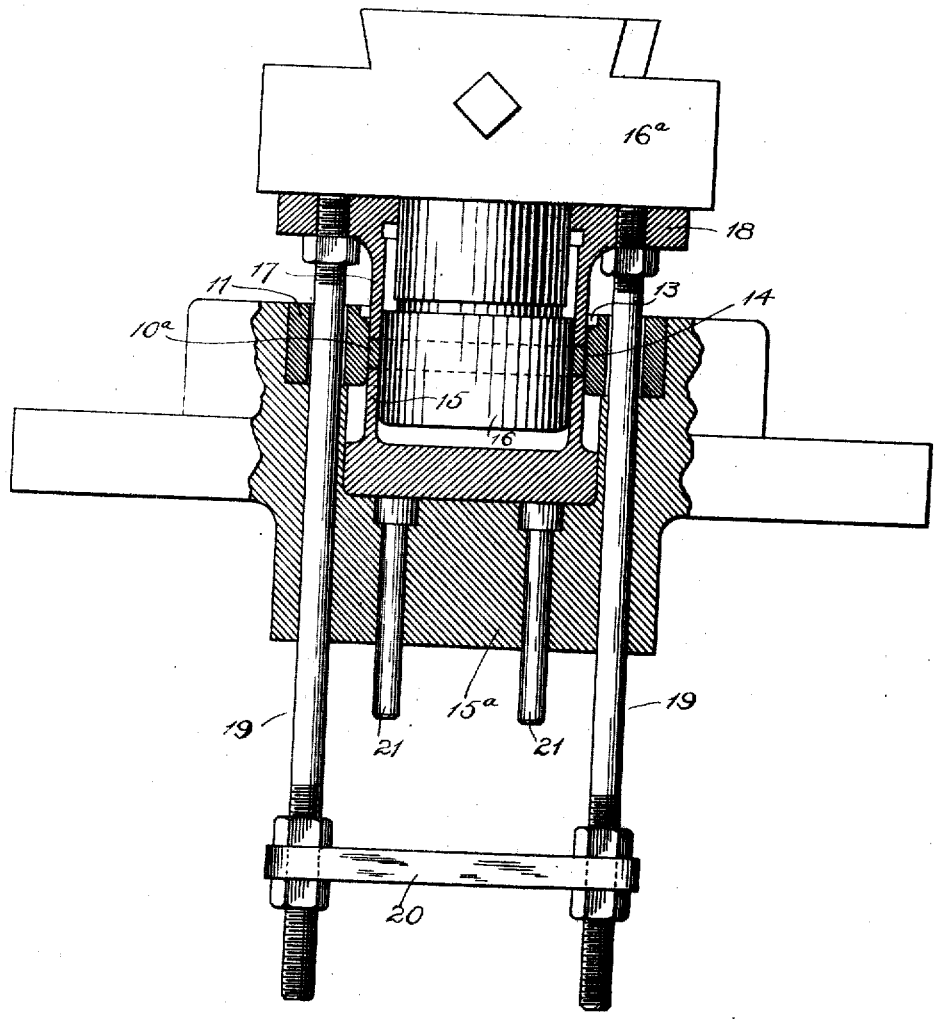

A. W. LIMONT.
APPARATUS FOR MAKING PROJECTILE BANDS AND THE LIKE.
APPLICATION FILED NOV. 5, 1915.
1,266,963.
Patented May 21, 1918.
4 SHEETS—SHEET 3.
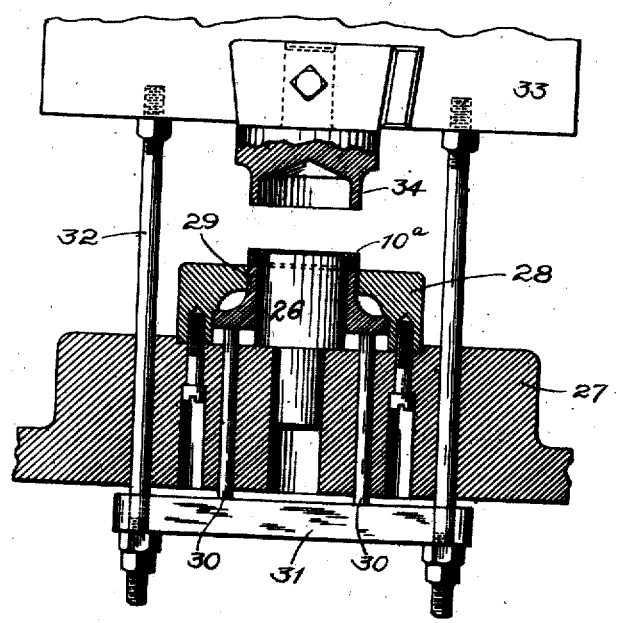
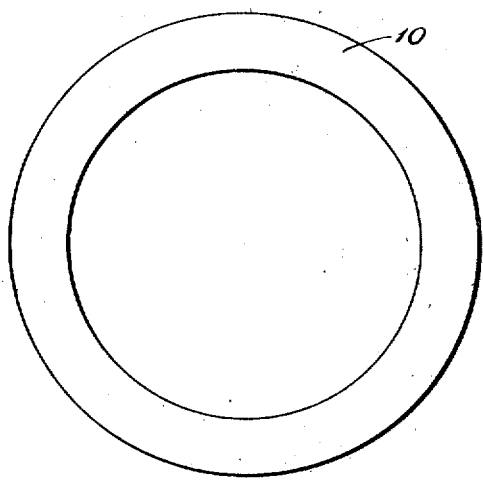
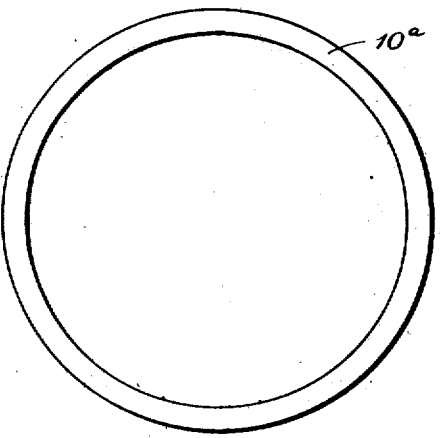

A. W. LIMONT.
APPARATUS FOR MAKING PROJECTILE BANDS AND THE LIKE.
APPLICATION FILED NOV. 5, 1915.

1,266,963.

Patented May 21, 1918.
4 SHEETS—SHEET 4.

UNITED STATES PATENT OFFICE.

ALEXANDER W. LIMONT, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

APPARATUS FOR MAKING PROJECTILE-BANDS AND THE LIKE.

1,266,963.   Specification of Letters Patent.   Patented May 21, 1918.

Application filed November 5, 1915. Serial No. 59,840.

*To all whom it may concern:*

Be it known that I, ALEXANDER W. LIMONT, a citizen of the United States, residing in Bridgeport, county of Fairfield, and State of Connecticut, have invented certain new and useful Improvements in Apparatus for Making Projectile-Bands and the like, of which the following is a full, clear, and exact description.

This invention relates to apparatus for the manufacture of copper or other metallic bands for projectiles, such as shrapnel.

In making projectile bands, the common practice now followed is to draw a seamless tube to the proper size from a solid billet or a cast shell, which tube is usually from six to twelve feet long, after which the tube is placed in a suitable cutting off machine and rings or bands of the required widths cut therefrom, one or more at a time.

One of the primary objects of the present invention is to provide a method which is much more simple, accurate and economical than that just mentioned.

Another object of the invention is to provide a simple form of apparatus for forming shrapnel or other bands or rings in a rapid but accurate manner from flat washers cut from a sheet or strip of copper or other metal of suitable gage.

To these and other ends, the invention consists in the novel steps and features to be hereinafter described and claimed.

In the accompanying drawing,

Fig. 2 is a similar view, showing a later stage of the operation;

Fig. 3 is an enlarged detail view of the blank;

Fig. 4 is a similar view of the band;

Fig. 7 is a sectional elevation on a smaller scale of a press for performing an operation subsequent to that shown in Figs. 5 and 6.

Figure 1:
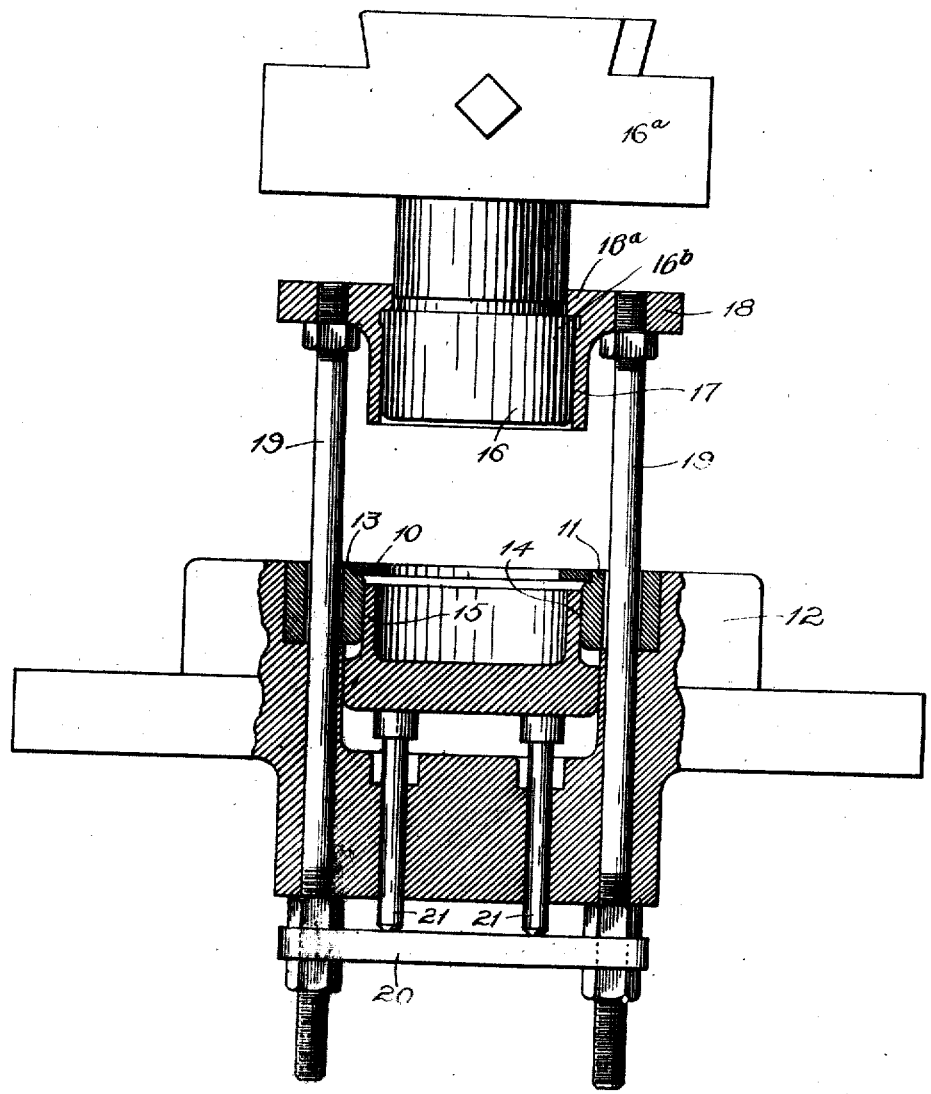
Figure 1 is a fragmentary elevation, partly in section, of a press used in carrying out my new method, showing the commencement of the operation.

Referring to the drawing, and more particularly to Figs. 1-4 inclusive, I use a blank 10 (Fig. 3) which is in the form of a washer of suitable size cut out of a flat strip or sheet of copper or like material of suitable gage. The blank 10 is then placed in a press, such as shown in Figs. 1 and 2, in which it is drawn to form the band, and the band is given the required internal and external diameter. In the form shown, the press is constructed as follows: A drawing die 11, mounted in a suitable bed plate 12, is provided with a cylindrical mouth portion 13 to receive the washer 10, and below the cylindrical mouth portion 13, the die is provided with a cylindrical wall 14 of less diameter, the portions 13 and 14 being joined by an easy curve or fillet. Guided vertically in the die opening is a cylindrical sizing sleeve 15, whose external diameter corresponds to that of the finished band, and whose internal diameter likewise corresponds to that of the finished band. The outer surface of this sleeve 15 is adapted to slide in close contact with the surface 14. Above the die 11 is a cylindrical drawing punch 16 mounted on a suitable cross head or gate 16ᵃ on the press. The external diameter of this drawing punch corresponds to the internal diameter of the finished band, and it is adapted to draw the blank 10 in the recess 13, and to then enter the sleeve 15. Surrounding the drawing punch 16 is a second sizing sleeve 17 corresponding to the sleeve 15. In the form shown, this sleeve 17 is formed integral with a cross head 18, mounted on rods 19 which support the sizing sleeve 15 by means of the plate 20 and lifter pins 21. At a suitable point in the downward travel of the punch 16, the cross head 18 and sleeve 17 are depressed by the abutment of the gate 16ᵃ against the cross head 18 which causes the sizing sleeve 15 to descend into the drawing die.

When the blank 10 has been placed in the drawing die in the manner shown in Fig. 1, the gate 16ᵃ of the press is caused to descend, and the punch 16 engages the inner part of the blank and displaces the metal in such inner portion in an outward direction and draws the blank down against the surface 14 so as to form it into a band 10ᵃ, as shown in Fig. 2. The roughly formed band is in the form of a cylinder whose inner and outer surfaces are substantially parallel to each other and whose edges are substantially at right angles to the inner and outer surfaces. After the band has been formed to its approximate final shape in the drawing die by the punch, it is subjected to pressure to perfect the same, and bring both the internal and external dimensions accurately to the required size. This is effected by the sizing sleeves 15, 17, as shown more particularly in Fig. 2. Before the press gate reaches the limit of its downward movement, the internal surface of the band is supported against the punch, the external surface is supported against the surface 14 of the die and the bottom surface rests on the upper edge of the sleeve 15, which sleeve in this position of the parts is rigidly supported from the bottom by a portion 15ᵃ of the bed plate. The upper edge of the band is contacted by the lower edge of the sizing sleeve 17, and as said sleeve is now subjected to heavy downward pressure, the band is highly compressed and caused to completely fill the space between the punch and die. During this operation, the punch acts as a sort of mandrel for the blank. In this manner, the band can be made very accurately as regards both internal and external diameter which, of course, is a matter of great importance.

On the upstroke of the press, the punch 16 carries upward the cross head 18 and sleeve 17, by engagement of a shoulder 16ᵃ on the punch with a shoulder 18ᵃ on the cross head, and the sleeve 15 is raised by the lifter pins 21, so as to eject the finished band from the die in an obvious manner.

Figure 5:
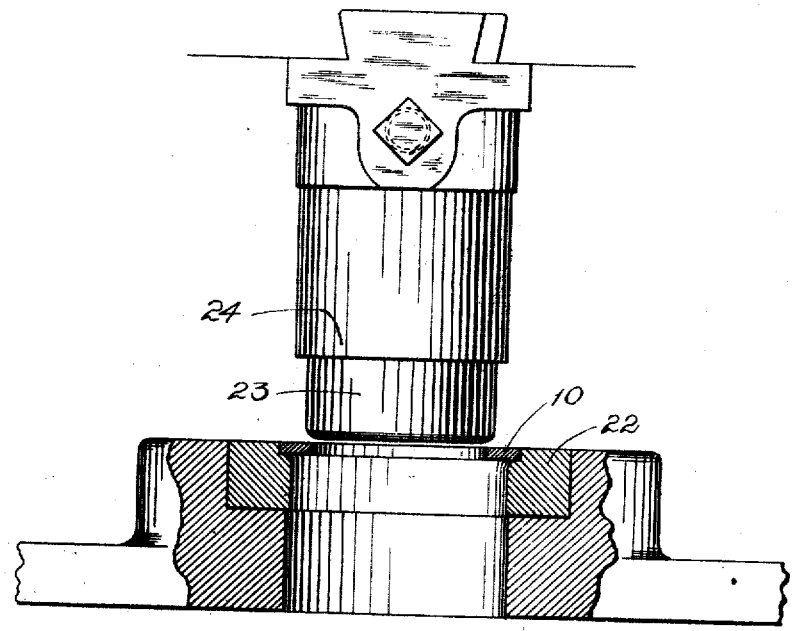
Figs. 5 and 6 are sectional elevations of another type of press which can be used.
Figure 6:
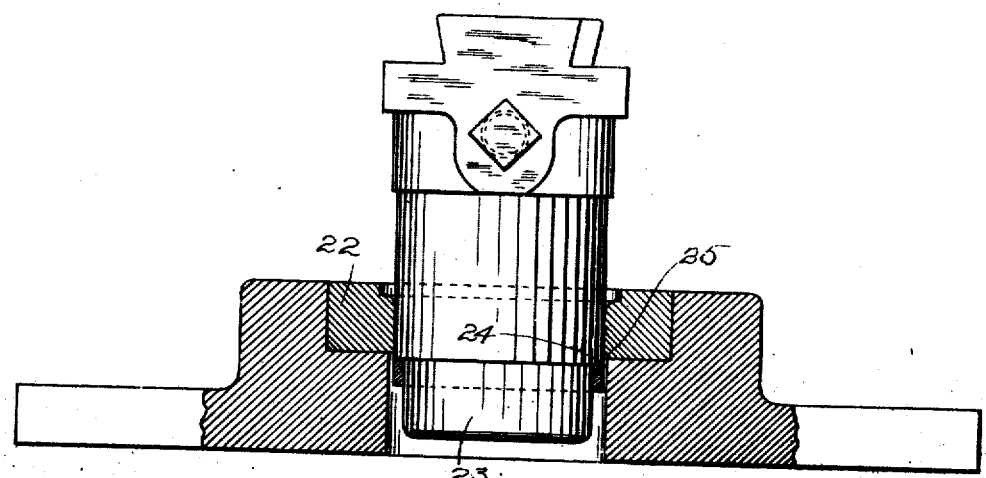

In Figs. 5, 6 and 7, I show another apparatus for carrying out the improved method. This apparatus comprises two sets of dies, one for drawing the blank, and the other for sizing the same, and therefore I do not consider it as desirable as the apparatus just described, in which the drawing and sizing are both carried out by the same dies. In Fig. 5, the washer 10 is drawn in a die 22 by means of a punch 23 having a shoulder 24. As the punch descends, the blank is drawn by the reduced lower end of the punch and takes up against the shoulder 24 on the punch. On the upstroke of the punch, the roughly formed band is stripped from the latter by the lower edge 25 of the die. The blank then falls out of the die, through the bottom thereof, and is placed in another press of the type shown in Fig. 7. This press has a fixed sizing punch or mandrel 26 on the bed plate 27, and around the punch 26 is a die 28. The internal diameter of the die opening corresponds to the external diameter of the finished band, and the external diameter of the punch 26 corresponds to the internal diameter of the finished band. A sizing sleeve 29 is adapted to slide up and down between the punch 26 and die 28, being mounted on rods 30 supported by a plate 31, which plate 31 is in turn supported by rods 32 from the gate 33 of the press. Another sizing sleeve 34 carried by the gate 33 is adapted to enter the space between the punch 26 and die 28 when the gate is lowered. The roughly finished blank is placed around the punch 26, as shown at 10ᵃ, and on the first part of the downward movement of the press, the plate 31 is lowered so as to let the sizing sleeve 29 down on the support 27, and thereby permit the blank 10ᵃ to move down into the die 28, where it is compressed between said die and the punch and the two sizing sleeves in substantially the same manner hereinbefore described, so as to perfect it in shape and bring it to the required dimensions.

It will be understood, of course, that the projectile band is usually of uniform section throughout its length, i. e., axial dimension, and that therefore both of the sizing sleeves are usually of the same thickness with squared off flat edges for pressing the band to size.

Various changes in the details of the apparatus herein described may be made without departing from the scope of the invention as defined in the claims.

It will be observed that in the apparatus shown in Fig. 7, as well as that shown in Figs. 1 and 2, I use a bed plate, a die thereon having a cylindrical inner surface, a mandrel member concentric with the die, and having a cylindrical outer surface adapted to face the inner surface of the die, there being a recess beneath the die, a vertically movable lower sleeve in said recess, the upper portion of which fits snugly between the mandrel and die, an upper sleeve for exerting downward pressure on the blank to size the same while it is supported on the lower sleeve, means for raising the lower sleeve to eject the finished band from the die, and means for actuating the upper sleeve.

I do not claim herein the method of making a projectile band, herein described in connection with Figs. 1 and 2 of the drawing, as the same is claimed in my co-pending application, Serial No. 149,875; nor do I claim the method herein employed of making projectile bands and the like by the method described in connection with Figs. 5, 6 and 7, as the same is broadly claimed in said application, Serial No. 149,875 and specifically claimed in my application, Serial No. 212,470. It is also to be understood that I do not claim herein the press construction shown in Figs. 5 and 6, the same being claimed in application Serial No. 212,470 above mentioned.

What I claim is:—

1. In apparatus for making projectile bands, the combination of a mandrel, a die member adapted to surround the mandrel, a sleeve within the die member adapted to support the blank from beneath, the outer surface of said sleeve adapted to move in contact with the inner surface of the die member, a second sleeve for exerting downward pressure on the blank to size the same while it is supported on the first sleeve between the mandrel and die member, the outer surface of said second sleeve also working in contact with the inner face of the die member, and means for actuating said first sleeve to eject the band from the die member; substantially as described.

2. In apparatus for making projectile bands, the combination of a mandrel, a die member adapted to surround the mandrel, a vertically movable sleeve within the die member adapted to support the blank from beneath, the outer surface of said sleeve adapted to move in contact with the inner surface of the die member, and a second sleeve for exerting downward pressure on the blank while it is supported on the first sleeve between the mandrel and die member, the outer surface of said second sleeve also working in contact with the inner face of the die member and the upper and lower edges of the first and second sleeves respectively being directed at right angles to the longitudinal axis of the mandrel, whereby the apparatus is adapted to size cylindrical projectile bands with flat edges; substantially as described.

3. In apparatus for making projectile bands, the combination of a bed plate, a die thereon having a cylindrical inner surface, a mandrel member concentric with the die and having a cylindrical outer surface adapted to face the inner surface of the die, there being a recess beneath the die, a vertically movable lower sleeve in said recess, the upper portion of which fits snugly between the mandrel and die, an upper sleeve for exerting downward pressure on the blank to size the same while it is supported on the lower sleeve, means for raising the lower sleeve to eject the finished band, and means for actuating the upper sleeve; substantially as described.

4. In apparatus for making projectile bands or the like, the combination of a drawing die, a punch for drawing a washer-like blank into a cylindrical band and means for compressing the blank in an axial direction while the punch and blank remain in the die to accurately size the band; substantially as described.

5. In apparatus for making projectile bands or the like, the combination of a drawing die, a drawing punch movable into and out of said die, said punch and die adapted to draw a washer into a cylindrical band, and means for compressing the band against the wall of the die and around the punch to accurately size the same, comprising a sleeve to support the band from beneath, and a second sleeve for exerting pressure on the blank while it is so supported; substantially as described.

6. In apparatus for making projectile bands or the like, the combination of a drawing die, a drawing punch movable into and out of the same, a sizing member in the bottom of the die having a limited sliding movement therein, and a sizing member surrounding the punch and having a limited sliding movement with respect to the latter; substantially as described.

7. In apparatus for making projectile bands or the like, the combination of a part having a drawing surface, a drawing punch adapted to draw a washer engaging said drawing surface so as to form a band, means for squeezing the band so as to displace the metal in a radial direction, said punch preventing further inward radial displacement of the metal when the requisite internal diameter of the band is obtained; substantially as described.

8. In apparatus for making projectile bands, means for sizing a roughly formed cylindrical blank having parallel inner and outer faces and flat edges, comprising a mandrel for supporting the blank interiorly, a die for supporting the blank exteriorly, and sizing sleeves for compressing the blank in the space between the mandrel and die, both of said sleeves working in snug engagement with the outer surface of the mandrel and the inner surface of the die and means for operating said sizing sleeves; substantially as described.

9. Apparatus for making projectile bands, comprising a drawing die, a punch to coöperate with said die in drawing a washer into a cylindrical band having parallel inner and outer surfaces and flat edges, and means coöperating with the punch and die to press the roughly formed band to the required size; substantially as described.

10. Apparatus for making projectile bands, comprising a die, a punch to draw a washer in said die into a band whose inner and outer surfaces are parallel to each other, and means for exerting axial pressure on the roughly formed band while it remains in the die around the punch to accurately size the same, comprising upper and lower sizing sleeves; substantially as described.

11. Apparatus for making projectile bands, comprising a die, a punch to draw a washer in said die into a band whose inner and outer surfaces are parallel to each other, and means for exerting pressure on the roughly formed band while it remains in the die around the punch, comprising upper and lower sizing sleeves, and means for operating said sleeves; substantially as described.

12. In apparatus for making projectile bands, the combination of means for drawing a flat washer into a ring whose inner and outer surfaces are parallel to each other, and means coöperating with said first means for pressing the ring to the required size; substantially as described.

In witness whereof, I have hereunto set my hand on the 1st day of November, 1915.

ALEXANDER W. LIMONT.